(12) United States Patent
Yang et al.

(10) Patent No.: US 12,634,826 B2
(45) Date of Patent: May 19, 2026

(54) ENERGY SAVING INFORMATION TRANSMISSION METHOD, TERMINAL AND NETWORK DEVICE

(71) Applicant: DATANG MOBILE COMMUNICATIONS EQUIPMENT CO., LTD., Beijing (CN)

(72) Inventors: Meiying Yang, Beijing (CN); Jiaqing Wang, Beijing (CN); Zheng Zhao, Beijing (CN); Chen Luo, Beijing (CN); Shaohui Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 390 days.

(21) Appl. No.: 17/764,969

(22) PCT Filed: Jun. 17, 2020

(86) PCT No.: PCT/CN2020/096499
§ 371 (c)(1),
(2) Date: Mar. 29, 2022

(87) PCT Pub. No.: WO2021/063031
PCT Pub. Date: Apr. 8, 2021

(65) Prior Publication Data
US 2022/0408361 A1 Dec. 22, 2022

(30) Foreign Application Priority Data
Sep. 30, 2019 (CN) .......................... 201910941181.0

(51) Int. Cl.
*H04W 52/02* (2009.01)

(52) U.S. Cl.
CPC ... *H04W 52/0235* (2013.01); *H04W 52/0216* (2013.01)

(58) Field of Classification Search
CPC ......... H04W 52/0235; H04W 52/0216; H04W 52/0229; H04W 52/0248; H04W 72/23; Y02D 30/70
See application file for complete search history.

(56) References Cited

U.S. PATENT DOCUMENTS

| | | | |
|---|---|---|---|
| 2019/0297576 A1 | 9/2019 | Jose et al. | |
| 2019/0297577 A1 | 9/2019 | Lin et al. | |

(Continued)

FOREIGN PATENT DOCUMENTS

| | | |
|---|---|---|
| CN | 103813458 A | 5/2014 |
| CN | 104469855 A | 3/2015 |

(Continued)

OTHER PUBLICATIONS

3GPP TSG RAN WG1 Meeting #97; R1-1906696; Source: LG Electronics; Title: Discussion on cross-slot scheduling for power saving; Reno, USA, May 13-17, 2019. (Year: 2019).*

(Continued)

*Primary Examiner* — Mohammed S Chowdhury
(74) *Attorney, Agent, or Firm* — Ladas & Parry, LLP

(57) ABSTRACT

The present disclosure provides an energy saving information transmitting method, a terminal, and a network device. The method includes: the terminal receives first energy saving information at a first moment, the first energy saving information is used to indicate transmission of the first information, and the terminal according to the first energy saving information The time when a piece of energy saving information indicates that the first information is processed is not earlier than the first time window starting from the first time.

18 Claims, 5 Drawing Sheets

(56) References Cited

U.S. PATENT DOCUMENTS

| | | | | |
|---|---|---|---|---|
| 2020/0296758 | A1 | 9/2020 | Li et al. | |
| 2020/0374918 | A1* | 11/2020 | Ang | H04L 5/0007 |
| 2021/0050985 | A1* | 2/2021 | Ang | H04W 72/23 |
| 2021/0400699 | A1* | 12/2021 | Nory | H04L 1/1819 |
| 2022/0104122 | A1* | 3/2022 | Maleki | H04W 52/0232 |
| 2022/0256458 | A1* | 8/2022 | Noh | H04W 52/0229 |
| 2022/0353893 | A1* | 11/2022 | Choi | H04L 5/0053 |
| 2023/0141497 | A1* | 5/2023 | Beale | H04W 72/0446 |
| | | | | 370/329 |

FOREIGN PATENT DOCUMENTS

| | | |
|---|---|---|
| CN | 106817773 A | 6/2017 |
| CN | 109995497 A | 7/2019 |
| EP | 2830367 A1 | 1/2015 |

OTHER PUBLICATIONS

3GPP TSG RAN WG1 #97;R1-1907105; Source: InterDigital, Inc.; Title: On Cross-slot Scheduling for UE Power Saving; Reno, USA, May 13-17, 2019. (Year: 2019).*

3GPP TSG RAN WG1 Meeting #98; R1-1908070; Source: Huawei, HiSilicon; Title: Procedure of cross-slot scheduling for UE power saving ; Prague, Czech Republic, Aug. 26-30, 2019. (Year: 2019).*

EP 19189915.2 (Filing date:Aug. 2, 2019)—Foreign Priority for U.S. Pat. No. 20230141497 A1 (Beale et al.); As per request from applicant, see remarks 9 as submitted on Aug. 2, 2024 (Year: 2019).*

3GPP TSG RAN WG2 NR #99bis; R2-1711904; Source: Qualcomm Incorporated; Title: UE Power Saving during Active State; Prague, Czech, Oct. 9-13, 2017 (Year: 2017).*

3GPP TSG RAN WG1 #96bis; R1- 1904986; Source: Apple Inc.; Title: Cross Slot Scheduling for UE Power Saving; Xi'an, China, Apr. 8-12, 2019 (Year: 2019).*

3GPP TSG-RAN WG1 #96; R1-1905032; Source: Qualcomm Incorporated; Title: Cross-slot scheduling power saving techniques; Xi'an, China, Apr. 8-12, 2019. (Year: 2019).*

The Extended European Search Report for European Patent Application No. 20872881.6 issued by the European Patent Office on Oct. 21, 2022.

"Power saving scheme with cross-slot scheduling operation" 3GPP TSG RAN WG1 Meeting #96bis R1-1905369, Xi'an, China, Apr. 8-12, 2019, Source: CATT, Agenda Item: 7.2.9.2.

"Cross-slot scheduling power saving techniques" 3GPP TSG-RAN WG1 #97 R1-1907295, Reno, USA, May 13-17, 2019, Agenda item: 7.2.9.2, Source: Qualcomm Incorporated.

International Search Report for PCT Application PCT/CN2020/ 096499, issued on Sep. 22, 2020, and its English Translation provided by WIPO.

Written Opinion for PCT Application PCT/CN2020/096499, issued on Sep. 22, 2020, and its English Translation provided by WIPO.

International Preliminary Report on Patentability for PCT Application PCT/CN2020/096499, issued on Apr. 5, 2022, and its English Translation provided by WIPO.

"Network-indication based Approaches for UE Power Saving," 3GPP TSG-RAN WG1 Meeting #94bis, R1- 1811127, Chengdu, China, Oct. 8-12, 2018, Agenda Item: 7.2.9.2.1, Source: Apple Inc., all pages.

"Discussion on cross-slot scheduling for power saving," 3GPP TSG RAN WG1 Meeting #96bis, R1-1904636, Xi'an, China, Apr. 8-12, 2019, Agenda Item: 7.2.9.2, Source: LG Electronics, all pages.

"On cross-slot scheduling for power saving," 3GPP TSG RAN WG1 #97, R1-1906857, Reno, USA, May 13-17, 2019, Agenda Item: 7.2.9.2, Source: Sony, all pages.

First Office Action for Chinese Patent Application 201910941181.0 issued on Jul. 21, 2021 by the Chinese Patent Office, and its English translation provided by foreign associate.

"Cross-slot scheduling for UE power saving in paging," 3GPP TSG-RAN WG1 Meeting #97, R1-1907328, Reno, USA, May 13-17, 2019, Agenda Item: 7.2.9.3, Source: Ericsson, all pages.

First Office Action for Taiwanese Patent Application 109121290 issued on Mar. 26, 2022 by the Taiwanese Patent Office, and its English translation provided by foreign associate.

* cited by examiner network
device

UE

| receiving, by a terminal, first energy saving information at a first moment | 201 |

| sending, by a network device, first energy saving information at a first moment | 301 |

700

900

900

901 first sending module

902 second sending module network device

1100 memory

1120 memory bus interface

1110 transceiver

1200 processor

1220 memory bus interface

1210 transceiver

ENERGY SAVING INFORMATION TRANSMISSION METHOD, TERMINAL AND NETWORK DEVICE

CROS-REFERENCE TO RELATED APPLICATIONS

This application is the U.S. national phase of PCT Application No. PCT/CN2020/096499 filed on Jun. 17, 2020, which claims priority to the Chinese patent application No. 201910941181.0 filed on Sep. 30, 2019, the disclosures of which are incorporated herein by reference in their entireties.

TECHNICAL FIELD

The present disclosure relates to the field of communications technology, in particular to an energy saving information transmission method, a terminal and a network device.

BACKGROUND

In some communication systems (for example, 5G systems), in order to improve the energy saving effect of the terminal, energy saving information is newly introduced, and the energy saving information may include application values, so that the terminal can save energy according to the energy saving information. However, after the terminal receives the energy saving information, it is a technical problem to be solved urgently at present that when to perform related processing according to the energy saving information.

SUMMARY

An object of the present disclosure is to provide an energy saving information transmission method, a terminal and a network device, so as to solve the problem when to implement the related processing according to the energy saving information after the terminal receives the energy saving information.

An embodiment of the present disclosure provides an energy saving information transmission method, it includes: receiving, by a terminal, first energy saving information at a first moment, wherein the first energy saving information is used to indicate transmission of first information, and a moment when the terminal processes the first information according to an instruction of the first energy saving information is not earlier than a first time window starting from the first moment.

Optionally, a duration of the first time window satisfies at least one of the following:

greater than or equal to a first fixed constant;

greater than or equal to a first application value in the first energy saving information;

greater than or equal to a first minimum application value;

greater than or equal to a maximum value among a plurality of parameters of the first application value in the first energy saving information;

greater than or equal to a minimum value among the plurality of parameters of the first application value in the first energy saving information;

greater than or equal to a maximum value among a plurality of parameters of the first minimum application value;

greater than or equal to a minimum value among the plurality of parameters of the first minimum application value;

greater than or equal to a time period from sending the first energy saving information to a moment of transmission of a configured data or signal;

greater than or equal to a time period from sending the first energy saving information to receiving a feedback, wherein the feedback is a feedback of the transmission of the configured data or signal.

Optionally, the method further includes: receiving, by the terminal, second energy saving information at a second moment, wherein the second energy saving information is used to indicate transmission of second information, and a moment when the terminal processes the second information according to an instruction of the second energy saving information is not earlier than a second time window starting from the second moment, and the second moment is not earlier than the first moment.

Optionally, a duration of the second time window satisfies at least one of the following:

greater than or equal to a second fixed constant;

greater than or equal to a second application value in the second energy saving information;

greater than or equal to a second minimum application value;

greater than or equal to a maximum value among a plurality of parameters of the second application value in the second energy saving information;

greater than or equal to a minimum value among the plurality of parameters of the second application value in the second energy saving information;

greater than or equal to a maximum value among a plurality of parameters of the second minimum application value;

greater than or equal to a minimum value among the plurality of parameters of the second minimum application value;

greater than or equal to a time period from sending the second energy saving information to a moment of transmission of a configured data or signal;

greater than or equal to a time period from sending the second energy saving information to receiving a feedback, wherein the feedback is a feedback of the transmission of the configured data or signal.

Optionally, a time interval between the first moment and the second moment is a third fixed constant or the first time window.

Optionally, the first energy saving information includes a first application value and/or a first minimum application value.

Optionally, the second application value in the second energy saving information is greater than or equal to the first minimum application value.

Optionally, the second energy saving information includes: a second application value and/or a second minimum application value.

Optionally, the terminal does not receive downlink control information (DCI) during a time interval between the first moment and the second moment.

Optionally, the first information comprises at least one of the following: control information, data information, reference signal information.

Optionally, the second information comprises at least one of the following: control information, data information, reference signal information.

An embodiment of the present disclosure provides an energy saving information transmission method, includes: sending, by a network device, first energy saving information at a first moment, wherein the first energy saving information is used to indicate transmission of first information, and a moment when the first energy saving information takes effect is no earlier than a first time window starting from the first moment.

Optionally, a duration of the first time window satisfies at least one of the following:

greater than or equal to a first fixed constant;

greater than or equal to a first application value in the first energy saving information;

greater than or equal to a first minimum application value;

greater than or equal to a maximum value among a plurality of parameters of the first application value in the first energy saving information;

greater than or equal to a minimum value among the plurality of parameters of the first application value in the first energy saving information;

greater than or equal to a maximum value among a plurality of parameters of the first minimum application value;

greater than or equal to a minimum value among the plurality of parameters of the first minimum application value;

greater than or equal to a time period from sending the first energy saving information to a moment of transmission of a configured data or signal;

greater than or equal to a time period from sending the first energy saving information to receiving a feedback, wherein the feedback is a feedback of the transmission of the configured data or signal.

Optionally, the method further includes: sending second energy saving information at a second time, wherein the second energy saving information is used to indicate transmission of second information, and a moment when the second energy saving information takes effect is not earlier than a second time window starting from the second moment, the second moment is not earlier than the first moment.

Optionally, a duration of the second time window satisfies at least one of the following:

greater than or equal to a second fixed constant;

greater than or equal to a second application value in the second energy saving information;

greater than or equal to a second minimum application value;

greater than or equal to a maximum value among a plurality of parameters of the second application value in the second energy saving information;

greater than or equal to a minimum value among the plurality of parameters of the second application value in the second energy saving information;

greater than or equal to a maximum value among a plurality of parameters of the second minimum application value;

greater than or equal to a minimum value among the plurality of parameters of the second minimum application value;

greater than or equal to a time period from sending the second energy saving information to a moment of transmission of a configured data or signal;

greater than or equal to a time period from sending the second energy saving information to receiving a feedback, wherein the feedback is a feedback of the transmission of the configured data or signal.

Optionally, a time interval between the first moment in time and the second moment in time is a third fixed constant or the first time window.

Optionally, the first power saving information comprises: a first application value and/or a first minimum application value.

Optionally, the second application value in the second energy saving information is greater than or equal to the first minimum application value.

Optionally, the second energy saving information comprises at least one of the following: a second application value and/or a second minimum application value.

Optionally, DCI is not sent during a time interval between the first moment and the second moment.

Optionally, the first information comprises at least one of the following: control information, data information, reference signal information.

Optionally, the second information comprises at least one of: control information, data information, reference signal information.

An embodiment of the present disclosure provides a terminal, includes: a first receiving module, configured to receive first energy saving information at a first moment, wherein the first energy saving information is used to indicate transmission of first information, and a moment when the terminal processes the first information according to an instruction of the first energy saving information is not earlier than a first time window starting from the first moment.

Optionally, the terminal further includes: a second receiving module, configured to receive second energy saving information at a second moment, wherein the second energy saving information is used to indicate transmission of second information, and a moment when the terminal processes the second information according to an instruction of the second energy saving information is not earlier than a second time window starting from the second moment, and the second moment is not earlier than the first moment.

Optionally, the first energy saving information includes: a first application value and/or a first minimum application value.

Optionally, the second application value in the second energy saving information is greater than or equal to the first minimum application value.

An embodiment of the present disclosure provides a network device, includes: a first sending module, configured to send first energy saving information at a first moment, wherein the first energy saving information is used to indicate transmission of first information, and a moment when the first energy saving information takes effect is no earlier than a first time window starting from the first moment.

Optionally, the network device further includes: a second sending module, configured to send second energy saving information at a second time, wherein the second energy saving information is used to indicate transmission of second information, and a moment when the second energy saving information takes effect is not earlier than a second time window starting from the second moment, the second moment is not earlier than the first moment.

Optionally, the first energy saving information includes: a first application value and/or a first minimum application value.

Optionally, the second application value in the second energy saving information is greater than or equal to the first minimum application value.

An embodiment of the present disclosure provides a terminal including: a transceiver, a memory, a processor, and a program stored on the memory and executed by the processor, wherein, the transceiver is configured to receive first energy saving information at a first moment, wherein the first energy saving information is used to indicate transmission of first information, and a moment when the terminal processes the first information according to an instruction of the first energy saving information is not earlier than a first time window starting from the first moment.

Optionally, a duration of the first time window satisfies at least one of the following:

greater than or equal to a first fixed constant;

greater than or equal to a first application value in the first energy saving information;

greater than or equal to a first minimum application value;

greater than or equal to a maximum value among a plurality of parameters of the first application value in the first energy saving information;

greater than or equal to a minimum value among the plurality of parameters of the first application value in the first energy saving information;

greater than or equal to a maximum value among a plurality of parameters of the first minimum application value;

greater than or equal to a minimum value among the plurality of parameters of the first minimum application value;

greater than or equal to a time period from sending the first energy saving information to a moment of transmission of a configured data or signal;

greater than or equal to a time period from sending the first energy saving information to receiving a feedback, wherein the feedback is a feedback of the transmission of the configured data or signal.

Optionally, the transceiver is further configured to: receive, by the terminal, second energy saving information at a second moment, wherein the second energy saving information is used to indicate transmission of second information, and a moment when the terminal processes the second information according to an instruction of the second energy saving information is not earlier than a second time window starting from the second moment, and the second moment is not earlier than the first moment.

Optionally, a duration of the second time window satisfies at least one of the following:

greater than or equal to a second fixed constant;

greater than or equal to a second application value in the second energy saving information;

greater than or equal to a second minimum application value;

greater than or equal to a maximum value among a plurality of parameters of the second application value in the second energy saving information;

greater than or equal to a minimum value among the plurality of parameters of the second application value in the second energy saving information;

greater than or equal to a maximum value among a plurality of parameters of the second minimum application value;

greater than or equal to a minimum value among the plurality of parameters of the second minimum application value;

greater than or equal to a time period from sending the second energy saving information to a moment of transmission of a configured data or signal;

greater than or equal to a time period from sending the second energy saving information to receiving a feedback, wherein the feedback is a feedback of the transmission of the configured data or signal.

Optionally, the first energy saving information includes a first application value and/or a first minimum application value.

Optionally, the second power saving information includes a second application value and/or a second minimum application value.

An embodiment of the present disclosure provides a network device, including: a transceiver, a memory, a processor, and a program stored on the memory and executed by the processor, wherein, the transceiver is configured to send first energy saving information at a first moment, wherein the first energy saving information is used to indicate transmission of first information, and a moment when the first energy saving information takes effect is no earlier than a first time window starting from the first moment.

Optionally, a duration of the first time window satisfies at least one of the following:

greater than or equal to a first fixed constant;

greater than or equal to a first application value in the first energy saving information;

greater than or equal to a first minimum application value;

greater than or equal to a maximum value among a plurality of parameters of the first application value in the first energy saving information;

greater than or equal to a minimum value among the plurality of parameters of the first application value in the first energy saving information;

greater than or equal to a maximum value among a plurality of parameters of the first minimum application value;

greater than or equal to a minimum value among the plurality of parameters of the first minimum application value;

greater than or equal to a time period from sending the first energy saving information to a moment of transmission of a configured data or signal;

greater than or equal to a time period from sending the first energy saving information to receiving a feedback, wherein the feedback is a feedback of the transmission of the configured data or signal.

Optionally, the transceiver is further configured to: send second energy saving information at a second time, wherein the second energy saving information is used to indicate transmission of second information, and a moment when the second energy saving information takes effect is not earlier than a second time window starting from the second moment, the second moment is not earlier than the first moment.

Optionally, wherein a duration of the second time window satisfies at least one of the following:

greater than or equal to a second fixed constant;

greater than or equal to a second application value in the second energy saving information;

greater than or equal to a second minimum application value;

greater than or equal to a maximum value among a plurality of parameters of the second application value in the second energy saving information;

greater than or equal to a minimum value among the plurality of parameters of the second application value in the second energy saving information;

greater than or equal to a maximum value among a plurality of parameters of the second minimum application value;

greater than or equal to a minimum value among the plurality of parameters of the second minimum application value;

greater than or equal to a time period from sending the second energy saving information to a moment of transmission of a configured data or signal;

greater than or equal to a time period from sending the second energy saving information to receiving a feedback, wherein the feedback is a feedback of the transmission of the configured data or signal.

Optionally, the first energy saving information includes: a first application value and/or a first minimum application value.

Optionally, the second energy saving information comprises at least one of the following: a second application value and/or a second minimum application value.

An embodiment of the present disclosure provides a computer-readable storage medium with a computer program stored thereon, wherein the program is executed by a processor to implement the energy saving information transmission method.

In an embodiment of the present disclosure, the terminal receives first energy saving information at a first moment, the first energy saving information is used to indicate transmission of first information, and a moment when the terminal processes the first information according to an instruction of the first energy saving information is not earlier than a first time window starting from the first moment, so as to solve the problem when to implement the related processing according to the energy saving information after the terminal receives the energy saving information, and improve the energy saving effect of the terminal.

DETAILED DESCRIPTION

In order to make the technical problem, technical solution, and advantage to be solved by the present disclosure clearer, a detailed description will be given below in conjunction with the accompanying drawings and specific embodiments.

Figures 1, 2, 3:
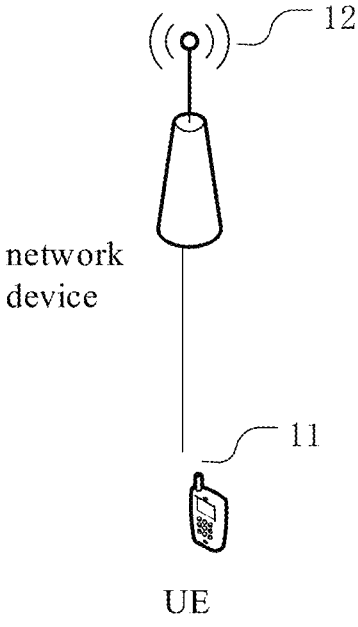
FIG. 1 is a schematic diagram of a network structure according to an embodiment of the present disclosure.
FIG. 2 is a flowchart of an energy saving information transmission method according to an embodiment of the present disclosure.
FIG. 3 is another flowchart of an energy saving information transmission method according to an embodiment of the present disclosure.

FIG. 1 is a schematic diagram of a network structure according to an embodiment of the present disclosure. As shown in FIG. 1, it includes a terminal 11 and a network device 12. The terminal 11 may be a User Equipment (UE) or other terminal equipment, for example: Mobile Phone, Tablet Personal Computer, Laptop Computer, Personal Digital Assistant (PDA), Mobile Internet Device (MID), Wearable Device, robots, vehicles and other terminal devices. It should be noted that the specific types of terminals are not limited in the embodiments of the present disclosure. The network device 12 may be a base station, such as a macro station, an LTE eNB, a 5G NR NB, etc.; the network device may also be a small station, such as a low power node (LPN), pico, femto and other small stations, or the network device may be an access point (AP); the network device may also be a central unit (CU), or may be a network node such as a transmission reception point (TRP). It should be noted that, the embodiments of the present disclosure do not limit the specific type of the network device.

FIG. 2 is a flowchart of an energy saving information transmission method provided by an embodiment of the present disclosure. As shown in FIG. 2, the method includes the following steps:

201. Receiving, by a terminal, first energy saving information at a first moment, wherein the first energy saving information is used to indicate transmission of first information, and a moment when the terminal processes the first information according to an instruction of the first energy saving information is not earlier than a first time window starting from a first moment.

The first energy saving information being used to indicate the transmission of the first information may be that the first energy saving information may be used to indicate a transmission resource and an interval of the first information, so that the terminal can determine the transmission of the first information according to the first energy saving information, before the first information is transmitted, the related device may be turned off or the channel may not be monitored, so as to save energy consumption or power consumption.

For example, the first energy saving information may include: a first application value and/or a first minimum application value. Wherein, the first application value may be an application value on which the terminal processes the first information, for example, may include but be limited to at least one of the following:

a time interval K0 from physical downlink shared channel (PDSCH) transmission/reception to physical downlink control channel (PDCCH) transmission/reception;

a feedback time interval K1 from PDSCH to Acknowledgement (ACK);

a time interval K2 from Physical uplink shared channel (PUSCH) transmission/reception to PDCCH transmission/reception;

a time interval from the PDCCH transmission/reception to an aperiodic channel state indication reference signal (CSI-RS) transmission/reception;

a time interval from the PDCCH transmission/reception to Sounding reference signal (SRS) transmission/reception;

a time interval from the PDCCH transmission/reception to CSI-RS transmission/reception related to an SRS request.

In addition, each item of the above parameters in the first energy saving information may be configured with at least one value, or may indicate a sequence number of a set consisting of the above-mentioned at least one item. For example, 1 bit represents energy saving information, bit 0 represents the sequence number 0, it means that each element in the set consisting of at least one item is configured as zero; bit 1 represents the sequence number 1, it means that each element in the set consisting of at least one item is configured as 1.

The above-mentioned first minimum application value may be the minimum value of the application value of the energy saving information, that is, the configurable minimum value of the application value of the energy saving information. For example: include at least one of the following:

a minimum value of the time interval from the PDSCH transmission/reception to the PDCCH transmission/reception;

a minimum value of the time interval from the PUSCH transmission/reception to the PDCCH transmission/reception;

a minimum value of the feedback time interval K1 from PDSCH to ACK;

a minimum value of the time interval from the PDCCH transmission/reception to the aperiodic CSI-RS transmission/reception;

a minimum value of the time interval from the PDCCH transmission/reception to the SRS transmission/reception, and a minimum value of the time interval from the PDCCH transmission/reception to the CSI-RS transmission/reception related to the SRS request.

In addition, the minimum value can be a positive integer greater than or equal to zero, and each item of the above-mentioned parameters can be configured with at least one value, or indicate the sequence number of the set consisting of the at least one item. For example, 1 bit represents energy saving information, bit 0 represents the sequence number 0, it means that each element in the set consisting of at least one item is configured as zero; bit 1 represents the sequence number 1, it means each element in the set consisting of at least one of the above items is configured as 1.

The first minimum application value can further be used to save the power consumption of the terminal. For example, taking the minimum value of K0 as an example, when the minimum value K0 is 1 (for example, it represents 1 time slot), then the terminal does not need to prepare for data reception within one time slot. Because K0 in the energy saving information will be greater than or equal to 1, the related devices can be turned off to save power consumption.

In this embodiment of the present disclosure, the time unit of the time interval may be a time slot, a symbol, or a millisecond.

It should be noted that, in this embodiment of the present disclosure, the first application value may also be referred to as a scheduling parameter, and the first minimum application value may also be referred to as the minimum value of the scheduling parameter. Further, in this embodiment of the present disclosure, the first energy saving information may include energy saving information scheduled across time slots, so the above-mentioned first application value may be an application value scheduled across time slots, or an application value of the energy saving information scheduled across time slots, or the energy saving information, or scheduling parameter across time slots. The above-mentioned first minimum application value may be the minimum application value scheduled across time slots, which may be the minimum value of the scheduling parameter across time slots, or the minimum value scheduled across time slots, or the minimum value of the application value of scheduling energy saving information across time slots.

Certainly, in the embodiment of the present disclosure, the first energy saving information may also be energy saving information scheduled in the current time slot (that is, not scheduled across time slots).

The moment when the terminal processes the first information according to the instruction of the first energy saving information being not earlier than the first time window starting from the first moment, and the terminal can process the first information according to the instruction of the first energy saving information after or when the first time window ends. The processing of the first information may be to perform an operation related to the transmission of the first information, for example, receiving or sending the first information.

In the embodiment of the present disclosure, through the above steps, it can be realized that the moment when the terminal processes the first information according to the instruction of the first energy saving information is not earlier than the first time window starting from the first moment, which can solve the problem that after the terminal receives the energy saving information, when to perform related processing according to the energy saving information. Since the moment when the terminal processes the first information according to the instruction of the first energy saving information is not earlier than the first time window, the energy saving effect of the terminal can also be improved, because the terminal does not need to process the first information related processing before the first time window, so as to save power consumption.

As an optional implementation, a duration of the first time window satisfies at least one of the following:

greater than or equal to a first fixed constant;

greater than or equal to the first application value in the first energy saving information;

greater than or equal to the first minimum application value;

greater than or equal to a maximum value among a plurality of parameters of the first application value in the first energy saving information;

greater than or equal to a minimum value among a plurality of parameters of the first application value in the first energy saving information;

greater than or equal to a maximum value among a plurality of parameters in the first minimum application value;

greater than or equal to a minimum value among a plurality of parameters in the first minimum application value;

greater than or equal to a time period from sending the first energy saving information to a transmission moment of a configured data or signal;

greater than or equal to a time period from sending the first energy saving information to receiving a feedback, where the feedback is a feedback of the transmission of the configured data or signal.

Wherein, when the first application value in the first energy saving information includes a plurality of parameters, the first application value greater than or equal to the first energy saving information may be greater than or equal to all parameters or equal to any one parameter, etc.

Similarly, in the case that the first minimum application value includes a plurality of parameters, the being greater than or equal to the first minimum application value may be greater than or equal to all parameters or equal to any parameter, or the like.

It should be noted that the first minimum application value may be statically or semi-statically configured, may be configured by a dynamic signaling, or configured through the first energy saving information.

As an optional implementation, the first information includes at least one of the following:

control information, data information, reference signal information.

The control information may be control information carrying the energy saving information, such as DCI, of course, this is not limited, and may also be other control information.

In this embodiment, the moment when the terminal processes at least one of control information, data information, and reference signal information according to the instruction of the first energy saving information can be not earlier than the first time window starting from the first moment, thereby saving energy power consumption of the terminal.

Further, the terminal may also process the first information according to the instruction of the first energy saving information, for example, sending or receiving the first information.

As an optional embodiment, the above method further includes:

Receiving, by the terminal, second energy saving information at a second moment, the second energy saving information is used to indicate the transmission of the second information, and a moment when the terminal processes the second information according to the instruction of the second energy saving information is not earlier than a second time window starting from a second moment, and the second moment is not earlier than the first moment.

The first time window and the second time window may be different, and the first energy saving information and the second energy saving information may be the same or different. In addition, when the first energy saving information and the second energy saving information are different, the application value of the second energy saving information may not be less than the first minimum application value in the first energy saving information. In addition, the first time window and the second time window may not overlap.

Optionally, the above-mentioned second information may include at least one of the following:

control information, data information, reference signal information.

Further, the terminal may also process the second information according to the instruction of the second energy saving information, for example, sending or receiving the second information.

Optionally, the second energy saving information may include energy saving information scheduled across time slots. Of course, this is not limited, for example, the energy saving information scheduled in the current time slot may be included (that is, not scheduled across time slots).

In addition, the first energy saving information may also be used to indicate transmission of the second energy saving information, for example, the control information included in the first information is used to carry the second energy saving information.

In this way, the network device configures the first energy saving information at the first moment, and the moment when the terminal processes the first information according to the instruction of the first energy saving information is not earlier than the first time window starting from the first moment, that is, the first energy saving information takes effect no earlier than the first time window starting from the first moment. The network device configures the second energy saving information at the second moment, and the moment when the terminal processes the second information according to the instructions of the second energy saving information is not earlier than the second time window starting from the second moment, that is, the second energy saving information takes effect no earlier than the second time window. The second moment is not earlier than the first moment, and the first energy saving information indicates the transmission of the second energy saving information. The first energy saving information at the first moment may take effect no earlier than the first time window, and the second energy saving information at the second moment may take effect no earlier than the second time window.

In the above embodiment, since the moment when the terminal processes the second information according to the instruction of the second energy saving information is not earlier than the second time window starting from the second moment, it can be realized that when the energy saving information (for example: the energy saving information scheduled across time slots) changes, the behavior within the configured processing time window is defined to save the power consumption of the terminal. It can also avoid the situation of data/signal loss and retransmission due to lack of buffering because of inconsistency in understanding between the network device and the terminal when the energy saving information scheduled across time slots changes and the carried DCI is lost. Therefore, the terminal can turn on or off the transceiver device according to the instruction of the network device, send and receive energy saving information scheduled across time slots, demodulate and decode the energy saving information, and send and receive data/signal, which further reduces the power consumption of the terminal.

Optionally, a duration of the second time window satisfies at least one of the following:

greater than or equal to a second fixed constant;

greater than or equal to a second application value in the second energy saving information;

greater than or equal to a second minimum application value;

greater than or equal to a maximum value among a plurality of parameters of the second application value in the second energy saving information;

greater than or equal to a minimum value among a plurality of parameters of the second application value in the second energy saving information;

greater than or equal to a maximum value among a plurality of parameters in the second minimum application value;

greater than or equal to a minimum value among a plurality of parameters in the second minimum application value;

greater than or equal to a time period from sending the second energy saving information to a transmission moment of a configured data or signal;

greater than or equal to a time period from sending the second energy saving information to receiving a feedback, where the feedback is a feedback of the transmission of the configured data or signal.

The second minimum application value may be an update of the first minimum application value, for example, the terminal may use the second minimum application value after the second time.

It should be noted that, for the duration of the second time window, reference may be made to the description of the duration of the first time window, which will not be repeated here.

It should be noted that, the second minimum application value may be statically or semi-statically configured, may be configured by dynamic signaling, or configured through the second energy saving information.

Optionally, the time interval between the first moment and the second moment is:

A third fixed constant, or the first time window.

Further, the time interval between the first moment and the second moment is implemented by: static configuration, semi-static configuration, dynamic configuration, high-level signaling configuration, radio resource control (RRC) signaling configuration, media Access control-control element (MAC-CE) configuration or DCI indication, etc.

Optionally, the second application value in the second energy saving information is greater than or equal to the first minimum application value.

In this implementation, since the second application value in the second energy saving information is greater than or equal to the first minimum application value, the terminal can perform related operations according to the first minimum application value before receiving the second energy saving information, for example: turning off a part of devices to save the power consumption of the terminal.

Optionally, the second energy saving information includes:

The second application value and/or the second minimum application value.

The second application value may be an application value used by the terminal to process the second information, for example, may include but be limited to at least one of the following:

a time interval $K0$ from PDSCH transmission/reception to PDCCH transmission/reception;

a feedback time interval $K1$ from PDSCH to ACK;

a time interval $K2$ from the PUSCH transmission/reception to the PDCCH transmission/reception;

a time interval from the PDCCH transmission/reception to aperiodic CSI-RS transmission/reception;

a time interval from the PDCCH transmission/reception to SRS transmission/reception;

a time interval from the PDCCH transmission/reception to the CSI-RS transmission/reception related to an SRS request.

In addition, each item of the above parameters in the second energy saving information may be configured with at least one value, or may indicate a sequence number of a set consisting of the above-mentioned at least one item. For example, 1 bit represents energy saving information, bit 0 represents the sequence number 0, it means that each element in the set consisting of at least one item is configured as zero; bit 1 represents the sequence number 1, it means that each element in the set consisting of at least one item is configured as 1.

The second minimum application value may be the minimum value of the application value of the energy saving information, that is, a configurable minimum value of the application value of one or more energy saving information after the second energy saving information, for example, including at least one of the following:

a minimum value of the time interval from the PDSCH transmission/reception to the PDCCH transmission/reception;

a minimum value of the time interval from the PUSCH transmission/reception to the PDCCH transmission/reception;

a minimum value of the feedback time interval $K1$ from PDSCH to ACK;

a minimum value of the time interval from the PDCCH transmission/reception to the aperiodic CSI-RS transmission/reception;

a minimum value of the time interval from the PDCCH transmission/reception to the SRS transmission/reception, and a minimum value of the time interval from the PDCCH transmission/reception to the CSI-RS transmission/reception related to the SRS request.

In addition, the minimum value can be a positive integer greater than or equal to zero, and each item of the above-mentioned parameters can be configured with at least one value, or indicate the sequence number of the set consisting of the at least one item. For example, 1 bit represents energy saving information, bit 0 represents the sequence number 0, it means that each element in the set consisting of at least one item is configured as zero; bit 1 represents the sequence number 1, it means each element in the set consisting of at least one of the above items is configured as 1.

The second minimum application value can further be used to save the power consumption of the terminal. For example, taking the minimum value of K0 as an example, when the minimum value K0 is 1 (for example, it represents 1 time slot), then the terminal does not need to prepare for data reception within one time slot. The related devices can be turned off to save power consumption.

Optionally, the terminal does not receive DCI during the time interval between the first moment and the second moment.

Wherein, the terminal does not receive DCI during the time interval between the first moment and the second moment may be that the terminal expects not to receive the DCI during the time interval between the first moment and the second moment, for example, the network device does not send DCI during the time interval between the first moment and the second moment.

Wherein, the DCI can be the DCI called by the data, or include other DCIs, for example, the DCI sent by calling Semi-Persistent Scheduling (SPS), the DCI sent by calling the SRS, the DCI sent by calling Transmission Control Protocol (TCP), DCI sent by calling random access channel (RACH), etc.

In this embodiment, since the terminal does not receive DCI during the time interval between the first moment and the second moment, the power consumption of the terminal can be further saved.

In the embodiment of the present disclosure, the terminal receives the first energy saving information at the first moment, the first energy saving information is used to indicate the transmission of the first information, and the moment when the terminal processes the first information according to the instruction of the first energy saving information is not earlier than the first time window starting from the first moment. Therefore, the problem of when to perform related processing according to the energy saving information after the terminal receives the energy saving information can be solved, and the energy saving effect of the terminal can also be improved.

FIG. 3 is another flowchart of an energy saving information transmission method provided by an embodiment of the present disclosure. As shown in FIG. 3, the method includes the following steps:

301. Sending, by a network device, first energy saving information at a first moment, wherein the first energy saving information is used to indicate the transmission of the first information, and a moment when the first energy saving information takes effect is no earlier than a first time window starting from a first moment.

Optionally, a duration of the first time window satisfies at least one of the following:

greater than or equal to a first fixed constant;

greater than or equal to the first application value in the first energy saving information;

greater than or equal to the first minimum application value;

greater than or equal to a maximum value among a plurality of parameters of the first application value in the first energy saving information;

greater than or equal to a minimum value among a plurality of parameters of the first application value in the first energy saving information;

greater than or equal to a maximum value among a plurality of parameters in the first minimum application value;

greater than or equal to a minimum value among a plurality of parameters in the first minimum application value;

greater than or equal to a time period from sending the first energy saving information to a transmission moment of a configured data or signal;

greater than or equal to a time period from sending the first energy saving information to receiving a feedback, where the feedback is a feedback of the transmission of the configured data or signal.

Optionally, the method further includes:

Sending second energy saving information at a second time, the second energy saving information is used to indicate the transmission of the second information, and a moment when the second energy saving information takes effect is not earlier than the second time window starting from a second moment, the second moment is not earlier than the first moment.

Optionally, a duration of the second time window satisfies at least one of the following:

greater than or equal to a second fixed constant;

greater than or equal to a second application value in the second energy saving information;

greater than or equal to a second minimum application value;

greater than or equal to a maximum value among a plurality of parameters of the second application value in the second energy saving information;

greater than or equal to a minimum value among a plurality of parameters of the second application value in the second energy saving information;

greater than or equal to a maximum value among a plurality of parameters in the second minimum application value;

greater than or equal to a minimum value among a plurality of parameters in the second minimum application value;

greater than or equal to a time period from sending the second energy saving information to a transmission moment of a configured data or signal;

greater than or equal to a time period from sending the second energy saving information to receiving a feedback, where the feedback is a feedback of the transmission of the configured data or signal.

Optionally, the time interval between the first moment and the second moment is:

A third fixed constant, or the first time window.

Optionally, the first energy saving information includes:

The first application value and/or the first minimum application value.

Optionally, the second application value in the second energy saving information is greater than or equal to the first minimum application value.

Optionally, the second energy saving information includes at least one of the following:

The first application value and/or the second minimum application value.

Optionally, DCI is not sent within a time interval between the first moment and the second moment.

Optionally, the first information includes at least one of the following:

Control information, data information, reference signal information.

Optionally, the second information includes at least one of the following:

Control information, data information, reference signal information.

It should be noted that this embodiment is an implementation of the network device corresponding to the embodiment shown in FIG. 2, and reference may be made to the relevant description of the embodiment shown in FIG. 2 for the specific implementation. In order to avoid repeated descriptions, the embodiment will not be repeated, and the same beneficial effects can also be achieved.

Hereinafter, the energy saving information transmission method provided by the embodiment of the present disclosure is illustrated by taking the network device as the base station and the energy saving information as the energy saving information scheduled across time slots.

Example 1

In this embodiment, the base station configuring the application value and/or the minimum value of the application value (i.e., the minimum application value) in the energy saving information may include the following steps:

Step 1: The base station configures the first energy saving information sent at the first moment and the second energy saving information sent at the second moment, wherein the first energy saving information sent by the base station at the first moment includes the first application value and/or the first minimum application value.

Wherein, the first application value in the first energy saving information may include but be limited to at least one of the following:

a time interval K0 from PDSCH transmission/reception to PDCCH transmission/reception;

a feedback time interval K1 from PDSCH to ACK;

a time interval K2 from PUSCH transmission/reception to PDCCH transmission/reception;

a time interval from the PDCCH transmission/reception to an aperiodic CSI-RS transmission/reception;

a time interval from the PDCCH transmission/reception to SRS transmission/reception;

a time interval from the PDCCH transmission/reception to CSI-RS transmission/reception related to an SRS request.

The above-mentioned first minimum application value may include at least one of the following:

a minimum value of the time interval from the PDSCH transmission/reception to the PDCCH transmission/reception;

a minimum value of the time interval from the PUSCH transmission/reception to the PDCCH transmission/reception;

a minimum value of the feedback time interval K1 from PDSCH to ACK;

a minimum value of the time interval from the PDCCH transmission/reception to the aperiodic CSI-RS transmission/reception;

a minimum value of the time interval from the PDCCH transmission/reception to the SRS transmission/reception, and a minimum value of the time interval from the PDCCH transmission/reception to the CSI-RS transmission/reception related to the SRS request.

Similarly, the second application value in the second energy saving information may include but be limited to at least one of the following:

a time interval K0 from PDSCH transmission/reception to PDCCH transmission/reception;

a feedback time interval K1 from PDSCH to ACK;

a time interval K2 from the PUSCH transmission/reception to the PDCCH transmission/reception;

a time interval from the PDCCH transmission/reception to aperiodic CSI-RS transmission/reception;

a time interval from the PDCCH transmission/reception to SRS transmission/reception;

a time interval from the PDCCH transmission/reception to the CSI-RS transmission/reception related to an SRS request.

Likewise, the above-mentioned second minimum application value may include at least one of the following:

a minimum value of the time interval from the PDSCH transmission/reception to the PDCCH transmission/reception;

a minimum value of the time interval from the PUSCH transmission/reception to the PDCCH transmission/reception;

a minimum value of the feedback time interval K1 from PDSCH to ACK;

a minimum value of the time interval from the PDCCH transmission/reception to the aperiodic CSI-RS transmission/reception;

a minimum value of the time interval from the PDCCH transmission/reception to the SRS transmission/reception, and a minimum value of the time interval from the PDCCH transmission/reception to the CSI-RS transmission/reception related to the SRS request.

The first minimum application value may be configured statically, semi-statically, or configured by dynamic signaling. The static state or semi-static state may be configured by high-layer signaling, or may be configured by RRC signaling. The dynamic signaling may be physical layer signaling or may be MAC-CE. In addition, the plurality of parameters of the first minimum application value may be the same, may be different, or may be partially the same. Specifically, which parameter having the same minimum value to be configured may be predefined by the base station, or statically or semi-statically configured, or may be dynamically configured.

Figure 4:
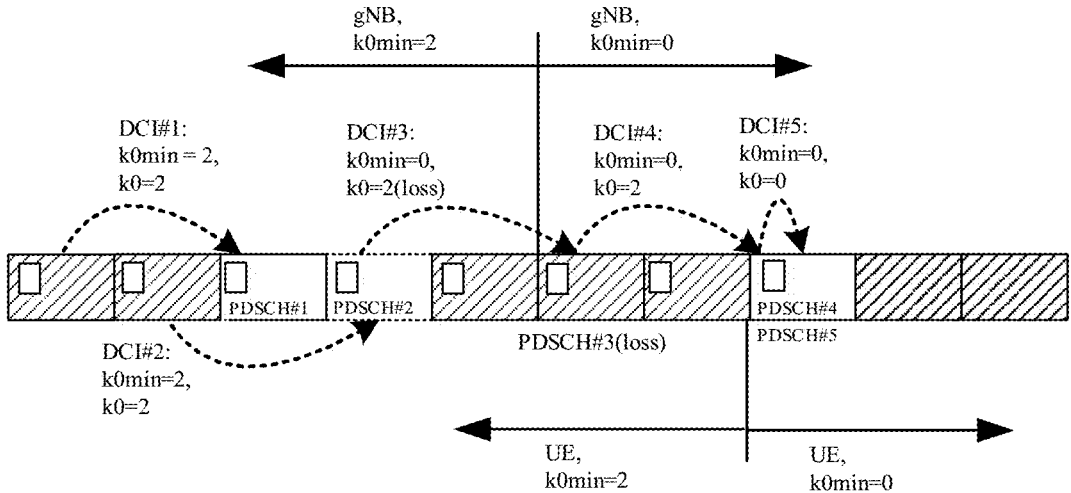
FIG. 4 is a schematic diagram of energy saving information transmission according to an embodiment of the present disclosure.

The first minimum application value and the second minimum application value may be different, that is, the second minimum application value of the second energy saving information may be change information configured by the second energy saving information. The change information may include: conversion between types of the configured second energy saving information and the first energy saving information scheduled across time slots, or conversion between parameters of the same type, specifically, it can be the conversion between scheduling in the current time slot and scheduling across time slots, the conversion between scheduling in the current time slot and unlimited scheduling, the conversion between scheduling across time slots and unlimited scheduling, and the conversion between the parameters of scheduling across time slots, and/or, The first application value of the first energy saving information configured by the base station at the first moment may be different from the second application value of the second energy saving information configured at the second moment; the first energy saving information may be used to indicate the transmission of the first information, where the first information may be information that carries the second energy saving information, so that the second energy saving information may be transmitted according to the information of scheduling across time slots indicated in the first energy saving information. That is, the second application value in the second energy saving information is greater than or equal to the first minimum application value. Further, the first minimum application value of the first energy saving information at the first moment may be the changed information configured by the energy saving information, may be the conversion from the scheduling across time slots to the scheduling in the current time slot, the conversion from the unlimited scheduling to the scheduling in the current time slot, the conversion from the scheduling in the current slot to the scheduling across time slots As shown in FIG. 4, the minimum value of k0 (k0min) of the second energy saving information indicated by DCI #3 is different from that of DCI #2, and the second application value k0=2 of the second energy saving information indicated by DCI #3 is greater than or equal to the first application value k0=2 of the first energy saving information indicated by DCI #2.

Step 2: The base station sends the first energy saving information at the first moment.

Step 3: The base station sends the second energy saving information at the second moment.

The first power saving information and/or the second power saving information may be sent periodically. A period of the DCI carrying the first power saving information and the second power saving information and a period used to indicate the scheduling information across time slots may be the same, or may be different.

If the first energy saving information and/or the second energy saving information are carried on a new DCI, the period of the DCI carrying the scheduling across time slots may be configured or triggered statically, semi-statically, by the dynamic signaling. The static and semi-static signaling may be high-layer signaling, RRC signaling, or MAC-CE, and the dynamic signaling may be physical layer signaling or channels, such as PDCCH, MAC-CE, an energy saving signal, etc.

If the first energy saving information and/or the second energy saving information is carried on an existing DCI, the energy saving information carrying the scheduling across time slots may be the same as the existing DCI period, or may be configured in a search space different from the scheduling DCI, so that different monitoring periods of DCIs can be configured accordingly.

Step 4: The base station transmits the first information.

Step 5: The base station transmits the second information.

The base station may transmit the first information according to the indication of the first energy saving information, and transmit the second information according to the indication of the second energy saving information, wherein the transmission includes sending or receiving.

Example 2

In this embodiment, the base station sends the first energy saving information at the first moment, and sends the second energy saving information at the second moment, which may include the following steps.

Step 1: The base station configures the first energy saving information and/or the second energy saving information.

Wherein, step 1 can refer to the description of step 1 in example 1, the difference is as follows.

The base station sends the first energy saving information at the first moment, where the first energy saving information carries the first application value and/or the first minimum application value. The base station sends the second energy saving information at the second moment, where the second energy saving information for scheduling across time slots carries the second application value and/or the second minimum application value.

The time interval between the first moment and the second moment may be a fixed constant, depending on the capabilities of the terminal, the constant may be semi-statically configured, reported by the terminal to the base station, or may be determined by the base station, or may be predefined by the base station and the terminal. For example, the terminal receiving time, demodulation and decoding time, and parameter obtaining time, etc., can be 0.5 slot, 1 slot (the subcarrier interval is 15 KHz, otherwise, the number of slots needs to be converted).

Figure 5:
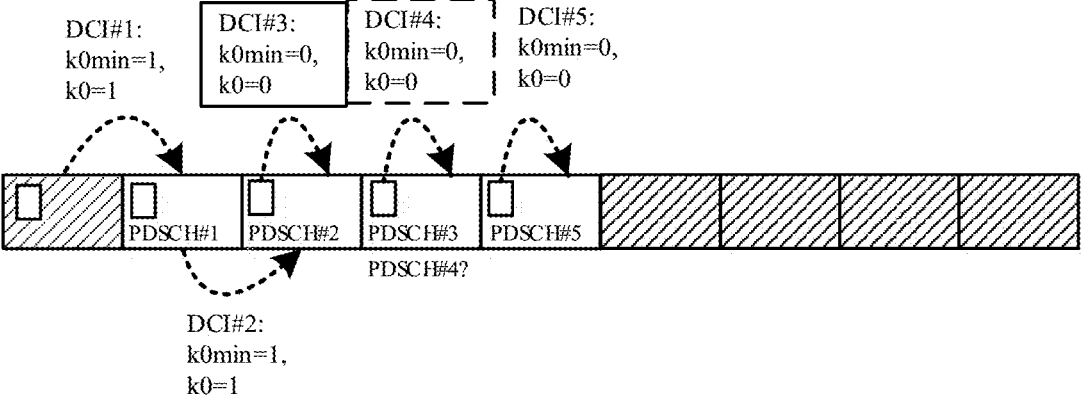
FIG. 5 is another schematic diagram of energy saving information transmission according to an embodiment of the present disclosure.

As shown in FIG. 5, after DCI #1 is sent, the terminal implements the reception, demodulation and decoding of DCI in one slot, so that in the next slot, data can be sent and received based on the instruction of DCI #1.

or,

The time interval between the first moment and the second moment is a first time window;

or,

The time interval between the first moment and the second moment may not be less than the configured first application value of the first energy saving information, and the first application value of the first energy saving information may be dynamically, statically or semi-statically configured, can be configured by high-level signaling, or configured by MAC-CE; or, The time interval between the first moment and the second moment may be greater than or equal to the configured first minimum application value, and the first minimum application value may be dynamically, statically or semi-statically configured, or is configured by high-layer signaling or by MAC-CE; or, The time interval between the first moment and the second moment may be greater than or equal to the maximum value among a plurality of parameters of the configured first application value in the first energy saving information, wherein the plurality of parameters are parameters of scheduling across time slots, which are the same as those in example 1; or, The time interval between the first moment and the second moment may be greater than or equal to the maximum value among a plurality of parameters of the first minimum application value in the first energy saving signal, wherein the plurality of parameters are the same as those in example 1;

or,

The time interval between the first moment and the second moment may be greater than or equal to the time period from sending the first energy saving information to the transmission moment of the configured data or signal. The transmission moment may be PDSCH reception/transmission, PUSCH reception/transmission, ACK reception/transmission, CSI-RS reception/transmission, and SRS reception/transmission; or, The time interval between the first moment and the second moment may be greater than or equal to the time period from sending the second energy saving information to receiving the feedback, where the feedback is the feedback of the transmission of the configured data or signal. The feedback moment may be the moment when the ACK of the PDSCH is received, or the moment when the DCI is scheduled. If the indication is a new transmission, the moment when the PDSCH is correctly sent and received may be the moment when the PUSCH is received correctly. For example, it can be the moment of DCI scheduling. If the indication is a new transmission, the PUSCH is correctly sent and received.

Figure 6:
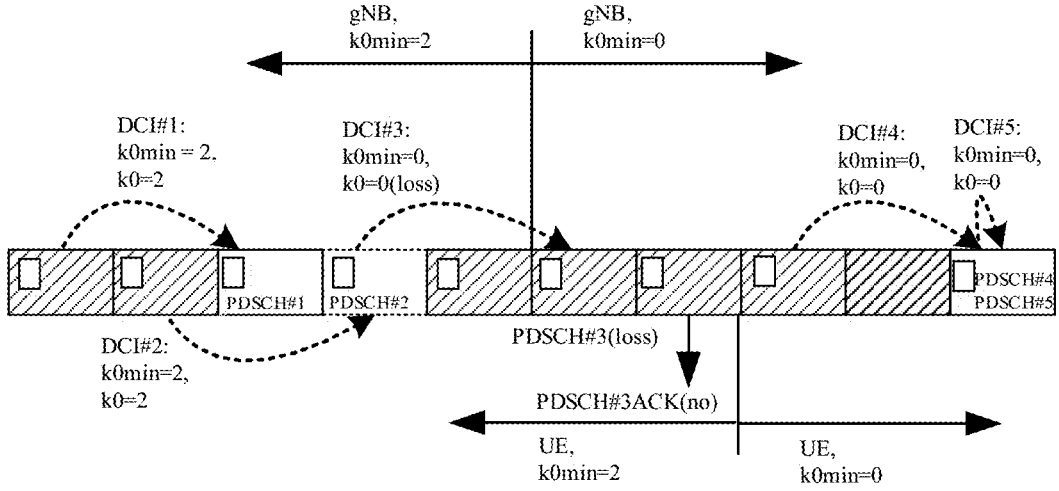
FIG. 6 is yet another schematic diagram of energy saving information transmission according to an embodiment of the present disclosure.

For example, as shown in FIG. 6, the time interval between the first moment and the second moment is after receiving the ACK.

In this embodiment, the time interval between the first moment and the second moment may be configured statically, semi-statically, dynamically, by the high-layer signaling, or by the RRC signaling, may be configured by MAC-CE or indicated by DCI.

Step 2: The base station sends the first energy saving information at the first moment.

Step 3: The base station sends the second energy saving information at the second moment.

Step 2 and Step 3 are the same as in Example 1.

Step 4: The base station transmits the first information.

Step 5: The base station transmits the second information.

Step 4 and Step 5 are the same as in Example 1.

Example 3

In this embodiment, the base station sends the first energy saving information at the first moment, sends the second energy saving information at the second moment, and does not send DCI in the time window between the first moment and the second moment.

Step 1: The base station configures the first energy saving information and/or the second energy saving information.

The difference between the step and those in Examples 1 and 2 is as follows.

During the time interval between the first moment and the second moment, no DCI is sent.

Step 2: The base station sends the first energy saving information at the first moment.

Step 3: The base station sends the second energy saving information at the second moment.

Step 2 and Step 3 are the same as in Example 1.

Step 4: The base station transmits the first information.

Step 5: The base station transmits the second information.

Step 4 and Step 5 are the same as in Example 1.

Example 4

In this embodiment, the terminal receives the first application value and the first minimum application value in the first energy saving information configured by the base station, and the second application value and the second minimum application value in the second energy saving information.

Step 1: The terminal receives the first energy saving information at the first moment.

Step 2: The terminal receives the second energy saving information at the second moment.

Step 1 and Step 2 are the same as in example 1, except that:

The terminal receives the energy saving information according to the configured monitoring period and moment of the first energy saving information and the second energy saving information. The first energy saving information is received at the first moment, and the second energy saving information is received at the second moment.

Step 3: The terminal obtains the indication information of the scheduling across time slots in the DCI according to the time interval configured by the base station.

The different between example 4 and examples 1, 2 and 3 is as follows.

The terminal obtains the first energy saving information at the configured first moment according to the instruction of the base station, or performs DCI monitoring according to the configuration of the obtained second energy saving information at the second moment.

According to the instruction of the base station, the terminal does not monitor the scheduled PDCCH within the time interval between the first moment and/or the second moment, and the base station may send the DCI for scheduling, or may not send the DCI for data scheduling, or, at the second moment, DCI monitoring is performed according to the configuration of the obtained second energy saving information.

Step 4: The terminal transmits the first information.

Step 5: The terminal transmits the second information.

In step 4, the terminal may receive or send the first information according to the indication of the first energy saving information, and in step 5, the terminal may receive or send the second information according to the indication of the second energy saving information.

In the embodiment of the present disclosure, the terminal can turn on or off the transceiver device according to the instructions of the network device, send and receive energy saving information scheduled across time slots, demodulate and decode the energy saving information, and send and receive data/signal, which further reduces the power consumption of the terminal.

Figure 7:
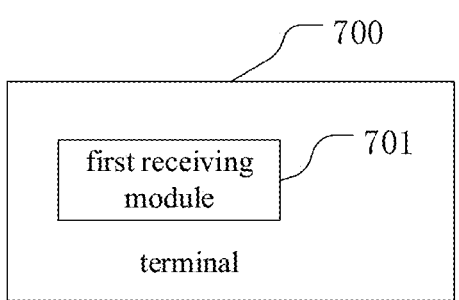
FIG. 7 is a structural diagram of a terminal according to an embodiment of the present disclosure.

FIG. 7 is a structural diagram of a terminal provided by an embodiment of the present disclosure. As shown in FIG. 7, the terminal 700 includes:

a first receiving module 701, configured to receive first energy saving information at a first moment, wherein the first energy saving information is used to indicate transmission of first information, and a moment when the terminal processes the first information according to an instruction of the first energy saving information is not earlier than a first time window starting from a first moment.

Optionally, a duration of the first time window satisfies at least one of the following:

greater than or equal to a first fixed constant;

greater than or equal to the first application value in the first energy saving information;

greater than or equal to the first minimum application value;

greater than or equal to a maximum value among a plurality of parameters of the first application value in the first energy saving information;

greater than or equal to a minimum value among a plurality of parameters of the first application value in the first energy saving information;

greater than or equal to a maximum value among a plurality of parameters in the first minimum application value;

greater than or equal to a minimum value among a plurality of parameters in the first minimum application value;

greater than or equal to a time period from sending the first energy saving information to a transmission moment of a configured data or signal;

greater than or equal to a time period from sending the first energy saving information to receiving a feedback, where the feedback is a feedback of the transmission of the configured data or signal.

Figure 8:
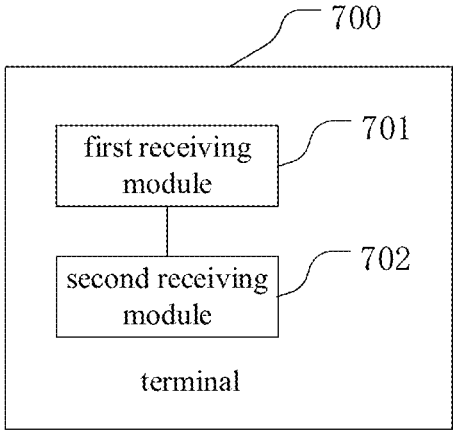
FIG. 8 is another structural diagram of a terminal according to an embodiment of the present disclosure.

Optionally, as shown in FIG. 8, the terminal 700 further includes:

a second receiving module 702, configured to receive second energy saving information at a second moment, the second energy saving information is used to indicate the transmission of the second information, and a moment when the terminal processes the second information according to the instruction of the second energy saving information is not earlier than a second time window starting from a second moment, and the second moment is not earlier than the first moment.

Optionally, a duration of the second time window satisfies at least one of the following:

greater than or equal to a second fixed constant;

greater than or equal to a second application value in the second energy saving information;

greater than or equal to a second minimum application value;

greater than or equal to a maximum value among a plurality of parameters of the second application value in the second energy saving information;

greater than or equal to a minimum value among a plurality of parameters of the second application value in the second energy saving information;

greater than or equal to a maximum value among a plurality of parameters in the second minimum application value;

greater than or equal to a minimum value among a plurality of parameters in the second minimum application value;

greater than or equal to a time period from sending the second energy saving information to a transmission moment of a configured data or signal;

greater than or equal to a time period from sending the second energy saving information to receiving a feedback, where the feedback is a feedback of the transmission of the configured data or signal.

Optionally, the time interval between the first moment and the second moment is:

A third fixed constant, or the first time window.

Optionally, the first energy saving information includes:

The first application value and/or the first minimum application value.

Optionally, the second application value in the second energy saving information is greater than or equal to the first minimum application value.

Optionally, the second energy saving information includes:

The second application value and/or the second minimum application value.

Optionally, the terminal does not receive DCI during the time interval between the first moment and the second moment.

Optionally, the first information includes at least one of the following:

Control information, data information, reference signal information.

Optionally, the second information includes at least one of the following:

Control information, data information, reference signal information.

It should be noted that the terminal 700 in this embodiment may be a terminal of any implementation in the method embodiment of the present disclosure, and any implementation of the terminal in the method embodiment of the present disclosure may be implemented by the terminal 700, the same beneficial effects are achieved, which will not be repeated here.

Figure 9:
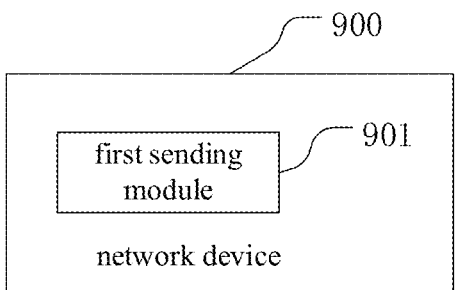
FIG. 9 is a structural diagram of a network device according to an embodiment of the present disclosure.

FIG. 9 is a structural diagram of a network device provided by an embodiment of the present disclosure. As shown in FIG. 9, the network device 900 includes:

a first sending module 901, configured to send first energy saving information at a first moment, wherein the first energy saving information is used to indicate the transmission of the first information, and a moment when the first energy saving information takes effect is no earlier than a first time window starting from a first moment.

Optionally, a duration of the first time window satisfies at least one of the following:

greater than or equal to a first fixed constant;

greater than or equal to the first application value in the first energy saving information;

greater than or equal to the first minimum application value;

greater than or equal to a maximum value among a plurality of parameters of the first application value in the first energy saving information;

greater than or equal to a minimum value among a plurality of parameters of the first application value in the first energy saving information;

greater than or equal to a maximum value among a plurality of parameters in the first minimum application value;

greater than or equal to a minimum value among a plurality of parameters in the first minimum application value;

greater than or equal to a time period from sending the first energy saving information to a transmission moment of a configured data or signal;

greater than or equal to a time period from sending the first energy saving information to receiving a feedback, where the feedback is a feedback of the transmission of the configured data or signal.

Figure 10:
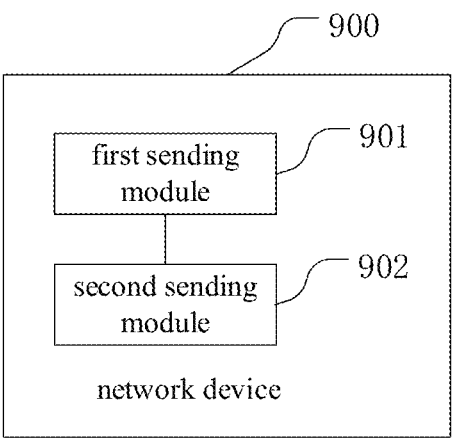
FIG. 10 is another structural diagram of a network device according to an embodiment of the present disclosure.

Optionally, as shown in FIG. 10, the terminal 900 further includes:

a second sending module 902, configured to send second energy saving information at a second time, the second energy saving information is used to indicate the transmission of the second information, and a moment when the second energy saving information takes effect is not earlier than the second time window starting from a second moment, the second moment is not earlier than the first moment.

Optionally, a duration of the second time window satisfies at least one of the following:

greater than or equal to a second fixed constant;

greater than or equal to a second application value in the second energy saving information;

greater than or equal to a second minimum application value;

greater than or equal to a maximum value among a plurality of parameters of the second application value in the second energy saving information;

greater than or equal to a minimum value among a plurality of parameters of the second application value in the second energy saving information;

greater than or equal to a maximum value among a plurality of parameters in the second minimum application value;

greater than or equal to a minimum value among a plurality of parameters in the second minimum application value;

greater than or equal to a time period from sending the second energy saving information to a transmission moment of a configured data or signal;

greater than or equal to a time period from sending the second energy saving information to receiving a feedback, where the feedback is a feedback of the transmission of the configured data or signal.

Optionally, the time interval between the first moment and the second moment is:

A third fixed constant, or the first time window.

Optionally, the first energy saving information includes:

The first application value and/or the first minimum application value.

Optionally, the second application value in the second energy saving information is greater than or equal to the first minimum application value.

Optionally, the second energy saving information includes at least one of the following:

The first application value and/or the second minimum application value.

Optionally, DCI is not sent within a time interval between the first moment and the second moment.

Optionally, the first information includes at least one of the following:

Control information, data information, reference signal information.

Optionally, the second information includes at least one of the following:

Control information, data information, reference signal information.

It should be noted that the network device 900 in this embodiment may be a network device in any implementation of the method embodiments of the present disclosure, and any implementation of the network device in the method embodiments of the present disclosure can be implemented by the network device 900 in this embodiment, and achieve the same beneficial effect, which is not repeated here.

Figure 11:
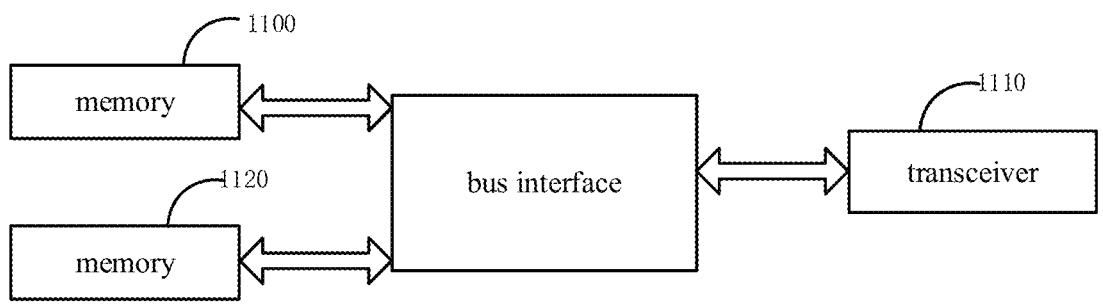
FIG. 11 is yet another structural diagram of a terminal according to an embodiment of the present disclosure.

FIG. 11 is another structural diagram of a terminal provided by an embodiment of the present disclosure. As shown in FIG. 11, the terminal includes: a transceiver 1110, a memory 1120, a processor 1100, and a program stored on the memory 1120 and executed by the processor 1100, wherein:

The transceiver 1110 is configured to receive first energy saving information at a first moment, wherein the first energy saving information is used to indicate transmission of first information, and a moment when the terminal processes the first information according to an instruction of the first energy saving information is not earlier than a first time window starting from a first moment.

The transceiver 1110 may be used to receive and transmit data under the control of the processor 1100.

In FIG. 11, the bus architecture may include any number of interconnected buses and bridges, in particular various circuits of one or more processors represented by processor 1100 and memory represented by memory 1120 linked together. The bus architecture may also link various other circuits together, such as peripherals, voltage regulators, and power management circuits, which are well known in the art and therefore will not be described further herein. The bus interface provides the interface. Transceiver 1110 may be a number of elements, including a transmitter and a receiver, units for communicating with various other devices over a transmission medium.

The processor 1100 is responsible for managing the bus architecture and general processing, and the memory 1120 may store data used by the processor 1100 in performing operations.

It should be noted that, the memory 1120 is not limited to only on the terminal, and the memory 1120 and the processor 1100 may be separated and located in different geographical locations.

Optionally, a duration of the first time window satisfies at least one of the following:

greater than or equal to a first fixed constant;

greater than or equal to the first application value in the first energy saving information;

greater than or equal to the first minimum application value;

greater than or equal to a maximum value among a plurality of parameters of the first application value in the first energy saving information;

greater than or equal to a minimum value among a plurality of parameters of the first application value in the first energy saving information;

greater than or equal to a maximum value among a plurality of parameters in the first minimum application value;

greater than or equal to a minimum value among a plurality of parameters in the first minimum application value;

greater than or equal to a time period from sending the first energy saving information to a transmission moment of a configured data or signal;

greater than or equal to a time period from sending the first energy saving information to receiving a feedback, where the feedback is a feedback of the transmission of the configured data or signal.

Optionally, the transceiver 1110 is also used to:

receive second energy saving information at a second moment, the second energy saving information is used to indicate the transmission of the second information, and a moment when the terminal processes the second information according to the instruction of the second energy saving information is not earlier than a second time window starting from a second moment, and the second moment is not earlier than the first moment Optionally, a duration of the second time window satisfies at least one of the following:

greater than or equal to a second fixed constant;

greater than or equal to a second application value in the second energy saving information;

greater than or equal to a second minimum application value;

greater than or equal to a maximum value among a plurality of parameters of the second application value in the second energy saving information;

greater than or equal to a minimum value among a plurality of parameters of the second application value in the second energy saving information;

greater than or equal to a maximum value among a plurality of parameters in the second minimum application value;

greater than or equal to a minimum value among a plurality of parameters in the second minimum application value;

greater than or equal to a time period from sending the second energy saving information to a transmission moment of a configured data or signal;

greater than or equal to a time period from sending the second energy saving information to receiving a feedback, where the feedback is a feedback of the transmission of the configured data or signal.

Optionally, the time interval between the first moment and the second moment is:

A third fixed constant, or the first time window.

Optionally, the first energy saving information includes:

The first application value and/or the first minimum application value.

Optionally, the second application value in the second energy saving information is greater than or equal to the first minimum application value.

Optionally, the second energy saving information includes:

The second application value and/or the second minimum application value.

Optionally, the terminal does not receive DCI during the time interval between the first moment and the second moment.

Optionally, the first information includes at least one of the following:

Control information, data information, reference signal information.

Optionally, the second information includes at least one of the following:

Control information, data information, reference signal information.

It should be noted that the terminal in this embodiment may be a terminal of any implementation in the method embodiment of the present disclosure, and any implementation of the terminal in the method embodiment of the present disclosure may be used by the terminal in this embodiment, achieves the same beneficial effects, will not be repeated here.

Figure 12:
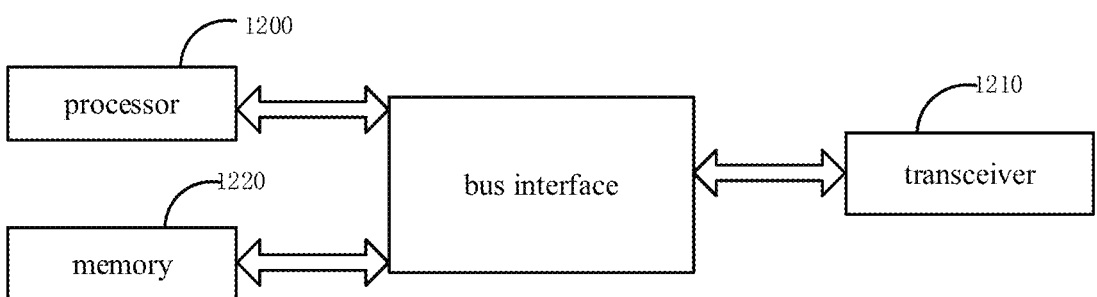
FIG. 12 is yet another structural diagram of a network device according to an embodiment of the present disclosure.

FIG. 12 is a structural diagram of another network device provided by an embodiment of the present disclosure. As shown in FIG. 12, the network device includes: a transceiver 1210, a memory 1220, a processor 1200, and a program stored on the memory 1220 and executed by the processor, wherein:

The transceiver 1210 is configured to send first energy saving information at a first moment, wherein the first energy saving information is used to indicate the transmission of the first information, and a moment when the first energy saving information takes effect is no earlier than a first time window starting from a first moment.

The transceiver 1210 may be used to receive and transmit data under the control of the processor 1200.

In FIG. 12, the bus architecture may include any number of interconnected buses and bridges, in particular various circuits of one or more processors represented by processor 1200 and memory represented by memory 1220 linked together. The bus architecture may also link together various other circuits, such as peripherals, voltage regulators, and power management circuits, which are well known in the art and therefore will not be described further herein. The bus interface provides the interface. Transceiver 1210 may be a number of elements, including a transmitter and a receiver, units for communicating with various other devices over a transmission medium.

The processor 1200 is responsible for managing the bus architecture and general processing, and the memory 1220 may store data used by the processor 1200 in performing operations.

It should be noted that the memory 1220 is not limited to only on the network device, and the memory 1220 and the processor 1200 may be separated and located in different geographical locations.

Optionally, a duration of the first time window satisfies at least one of the following:

greater than or equal to a first fixed constant;

greater than or equal to the first application value in the first energy saving information;

greater than or equal to the first minimum application value;

greater than or equal to a maximum value among a plurality of parameters of the first application value in the first energy saving information;

greater than or equal to a minimum value among a plurality of parameters of the first application value in the first energy saving information;

greater than or equal to a maximum value among a plurality of parameters in the first minimum application value;

greater than or equal to a minimum value among a plurality of parameters in the first minimum application value;

greater than or equal to a time period from sending the first energy saving information to a transmission moment of a configured data or signal;

greater than or equal to a time period from sending the first energy saving information to receiving a feedback, where the feedback is a feedback of the transmission of the configured data or signal.

Optionally, the transceiver 1210 is also used to:

send second energy saving information at a second time, the second energy saving information is used to indicate the transmission of the second information, and a moment when the second energy saving information takes effect is not earlier than the second time window starting from a second moment, the second moment is not earlier than the first moment.

Optionally, a duration of the second time window satisfies at least one of the following:

greater than or equal to a second fixed constant;

greater than or equal to a second application value in the second energy saving information;

greater than or equal to a second minimum application value;

greater than or equal to a maximum value among a plurality of parameters of the second application value in the second energy saving information;

greater than or equal to a minimum value among a plurality of parameters of the second application value in the second energy saving information;

greater than or equal to a maximum value among a plurality of parameters in the second minimum application value;

greater than or equal to a minimum value among a plurality of parameters in the second minimum application value;

greater than or equal to a time period from sending the second energy saving information to a transmission moment of a configured data or signal;

greater than or equal to a time period from sending the second energy saving information to receiving a feedback, where the feedback is a feedback of the transmission of the configured data or signal.

Optionally, the time interval between the first moment and the second moment is:

A third fixed constant, or the first time window.

Optionally, the first energy saving information includes:

The first application value and/or the first minimum application value.

Optionally, the second application value in the second energy saving information is greater than or equal to the first minimum application value.

Optionally, the second energy saving information includes at least one of the following:

The first application value and/or the second minimum application value.

Optionally, DCI is not sent within a time interval between the first moment and the second moment.

Optionally, the first information includes at least one of the following:

Control information, data information, reference signal information.

Optionally, the second information includes at least one of the following:

Control information, data information, reference signal information.

It should be noted that the network device in this embodiment may be a network device in any implementation in the method embodiment of the present disclosure, and any implementation in the network device in the method embodiment of the present disclosure may be implemented by the network device in this embodiment, and achieves the same beneficial effects, which will not be repeated here.

Embodiments of the present disclosure further provide a computer-readable storage medium on which a computer program is stored, wherein when the program is executed by a processor, the steps in the energy saving information transmission method at the terminal side provided by the embodiments of the present disclosure are implemented, or, when the program is executed by the processor, the steps in the energy saving information transmission method on the network device side provided by the embodiments of the present disclosure are implemented.

In the several embodiments provided in this application, it should be understood that the disclosed method and devices may be implemented in other manners. For example, the device embodiments described above are only illustrative. For example, the division of the units is only a logical function division. In actual implementation, there may be other division methods. For example, multiple units or components may be combined or integrated into another system, or some features can be ignored, or not implemented. On the other hand, the shown or discussed mutual coupling or direct coupling or communication connection may be through some interfaces, indirect coupling or communication connection of devices or units, and may be in electrical, mechanical or other forms.

In addition, each functional unit in each embodiment of the present disclosure may be integrated into one processing unit, or each unit may be physically included individually, or two or more units may be integrated into one unit. The above-mentioned integrated unit may be implemented in the form of hardware, or may be implemented in the form of hardware and software functional units.

The above-mentioned integrated units implemented in the form of software functional units can be stored in a computer-readable storage medium. The above-mentioned software functional unit is stored in a storage medium, and includes several instructions to enable a computer device (which may be a personal computer, a server, or a network device, etc.) to execute part steps of the method for processing information data blocks described in various embodiments of the present disclosure. The storage medium includes: U disk, mobile hard disk, read-only memory (ROM), random access memory (RAM), magnetic disk or optical disk and other media that can store program codes.

The above are the optional embodiments of the present disclosure. It should be pointed out that for those skilled in the art, several improvements and modifications can be made without departing from the principles described in the present disclosure. It should be regarded as the protection scope of the present disclosure.

What is claimed is:

1. An energy saving information transmission method, comprising:

receiving, by a terminal, first energy saving information at a first moment, wherein the first energy saving information is used to indicate transmission of first information, and a moment when the terminal processes the first information according to an instruction of the first energy saving information is not earlier than a first time window starting from the first moment; wherein the first energy saving information comprises energy saving information scheduled across time slots;

receiving, by the terminal, second energy saving information at a second moment, wherein the second energy saving information is used to indicate transmission of second information, and a moment when the terminal processes the second information according to an instruction of the second energy saving information is not earlier than a second time window starting from the second moment, and the second moment is not earlier than the first moment;

wherein a duration of the first time window satisfies: greater than or equal to a first fixed constant, and greater than or equal to a first minimum application value;

wherein a duration of the second time window satisfies: greater than or equal to a second fixed constant, and greater than or equal to a second minimum application value.

2. The method according to claim 1, wherein the duration of the first time window further satisfies at least one of the following:

greater than or equal to a first application value in the first energy saving information;

greater than or equal to a maximum value among a plurality of parameters of the first application value in the first energy saving information;

greater than or equal to a minimum value among the plurality of parameters of the first application value in the first energy saving information;

greater than or equal to a maximum value among a plurality of parameters of the first minimum application value;

greater than or equal to a minimum value among the plurality of parameters of the first minimum application value;

greater than or equal to a time period from sending the first energy saving information to a moment of transmission of a configured data or signal;

greater than or equal to a time period from sending the first energy saving information to receiving a feedback, wherein the feedback is a feedback of the transmission of the configured data or signal.

3. The method according to claim 1, wherein the duration of the second time window further satisfies at least one of the following:

greater than or equal to a second application value in the second energy saving information;

greater than or equal to a maximum value among a plurality of parameters of the second application value in the second energy saving information;

greater than or equal to a minimum value among the plurality of parameters of the second application value in the second energy saving information;

greater than or equal to a maximum value among a plurality of parameters of the second minimum application value;

greater than or equal to a minimum value among the plurality of parameters of the second minimum application value;

greater than or equal to a time period from sending the second energy saving information to a moment of transmission of a configured data or signal;

greater than or equal to a time period from sending the second energy saving information to receiving a feedback, wherein the feedback is a feedback of the transmission of the configured data or signal.

4. The method according to claim 1, wherein a time interval between the first moment and the second moment is a third fixed constant or the first time window.

5. The method according to claim 1, wherein the first energy saving information comprises:

a first application value and/or a first minimum application value.

6. The method according to claim 1, wherein the second application value in the second energy saving information is greater than or equal to the first minimum application value.

7. The method according to claim 1, wherein the second energy saving information comprises:

a second application value and/or a second minimum application value.

8. The method according to claim 1, wherein the terminal does not receive downlink control information (DCI) during a time interval between the first moment and the second moment.

9. The method according to claim 1, wherein the first information comprises at least one of the following:

control information, data information, reference signal information.

10. The method according to claim 1, wherein the second information comprises at least one of the following:

control information, data information, reference signal information.

11. An energy saving information transmission method, comprising:

sending, by a network device, first energy saving information at a first moment, wherein the first energy saving information is used to indicate transmission of first information, and a moment when the first energy saving information takes effect is no earlier than a first time window starting from the first moment; wherein the first energy saving information comprises energy saving information scheduled across time slots;

sending second energy saving information at a second time to a terminal, wherein the second energy saving information is used to indicate transmission of second information, and a moment when the second energy saving information takes effect is not earlier than a second time window starting from the second moment, the second moment is not earlier than the first moment;

wherein a duration of the first time window satisfies: greater than or equal to a first fixed constant, and greater than or equal to a first minimum application value;

wherein a duration of the second time window satisfies: greater than or equal to a second fixed constant, and greater than or equal to a second minimum application value.

12. The method according to claim 11, wherein the duration of the first time window further satisfies at least one of the following:

greater than or equal to a first application value in the first energy saving information;

greater than or equal to a maximum value among a plurality of parameters of the first application value in the first energy saving information;

greater than or equal to a minimum value among the plurality of parameters of the first application value in the first energy saving information;

greater than or equal to a maximum value among a plurality of parameters of the first minimum application value;

greater than or equal to a minimum value among the plurality of parameters of the first minimum application value;

greater than or equal to a time period from sending the first energy saving information to a moment of transmission of a configured data or signal;

greater than or equal to a time period from sending the first energy saving information to receiving a feedback, wherein the feedback is a feedback of the transmission of the configured data or signal.

13. The method according to claim 11, wherein the duration of the second time window further satisfies at least one of the following:

greater than or equal to a second application value in the second energy saving information;

greater than or equal to a maximum value among a plurality of parameters of the second application value in the second energy saving information;

greater than or equal to a minimum value among the plurality of parameters of the second application value in the second energy saving information;

greater than or equal to a maximum value among a plurality of parameters of the second minimum application value;

greater than or equal to a minimum value among the plurality of parameters of the second minimum application value;

greater than or equal to a time period from sending the second energy saving information to a moment of transmission of a configured data or signal;

greater than or equal to a time period from sending the second energy saving information to receiving a feedback, wherein the feedback is a feedback of the transmission of the configured data or signal.

14. The method according to claim 11, wherein a time interval between the first moment in time and the second moment in time is a third fixed constant or the first time window.

15. The method according to claim 11, wherein the first power saving information comprises: a first application value and/or a first minimum application value; or DCI is not sent during a time interval between the first moment and the second moment; or the first information comprises at least one of the following:

control information, data information, reference signal information.

16. The method according to claim 11, wherein the second application value in the second energy saving information is greater than or equal to the first minimum application value; or the second energy saving information comprises at least one of the following:

a second application value and/or a second minimum application value.

17. A network device, comprising: a transceiver, a memory, a processor, and a program stored on the memory and executed by the processor, wherein, the program is executed by the processor to implement the energy saving information transmission method according to claim 11.

18. A terminal comprising: a transceiver, a memory, a processor, and a program stored on the memory and executed by the processor, wherein, the transceiver is configured to receive first energy saving information at a first moment, wherein the first energy saving information is used to indicate transmission of first information, and a moment when the terminal processes the first information according to an instruction of the first energy saving information is not earlier than a first time window starting from the first moment; wherein the first energy saving information comprises energy saving information scheduled across time slots;

the transceiver is further configured to receive second energy saving information at a second moment, wherein the second energy saving information is used to indicate transmission of second information, and a moment when the terminal processes the second information according to an instruction of the second energy saving information is not earlier than a second time window starting from the second moment, and the second moment is not earlier than the first moment;

wherein a duration of the first time window satisfies: greater than or equal to a first fixed constant, and greater than or equal to a first minimum application value;

wherein a duration of the second time window satisfies: greater than or equal to a second fixed constant, and greater than or equal to a second minimum application value.

* * * * *